UNITED STATES PATENT OFFICE.

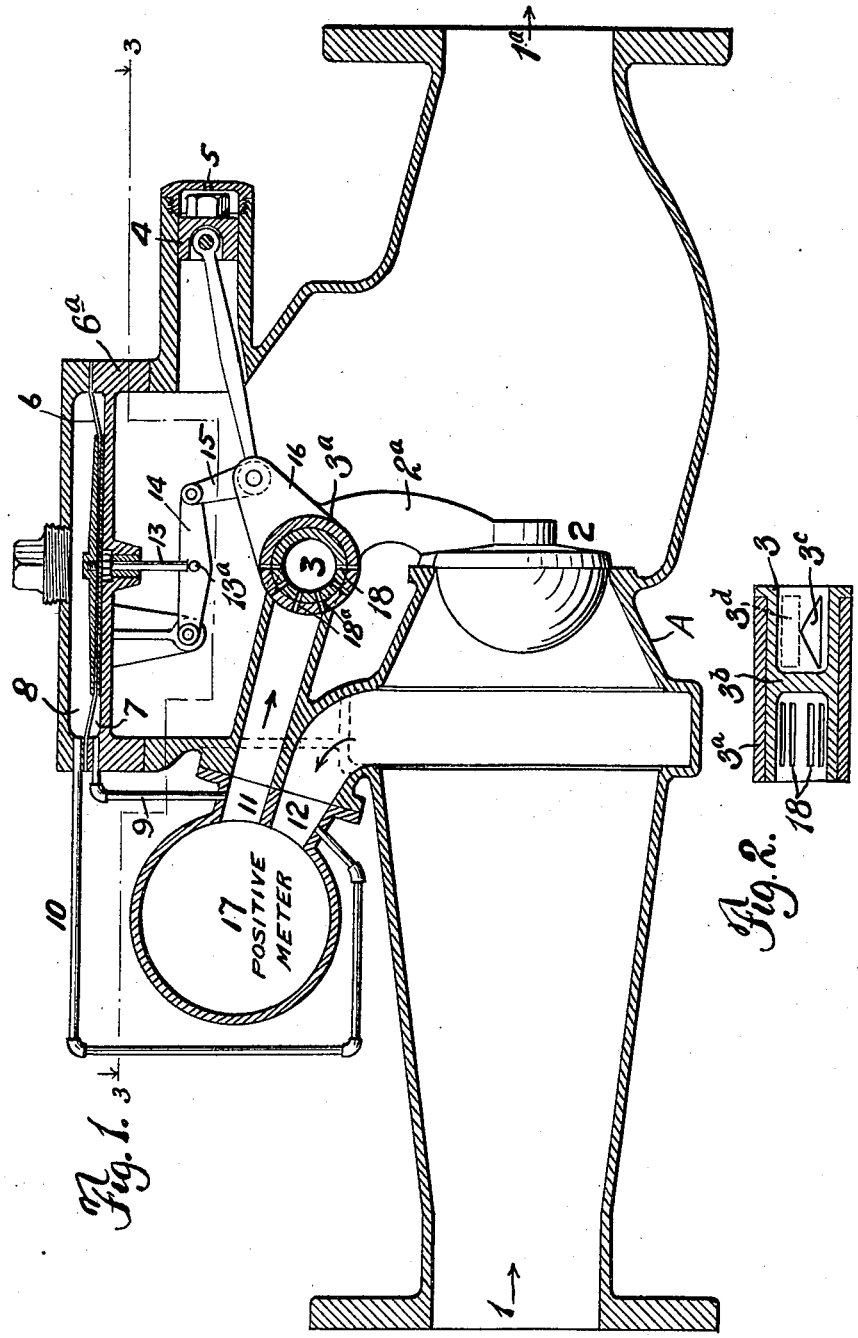

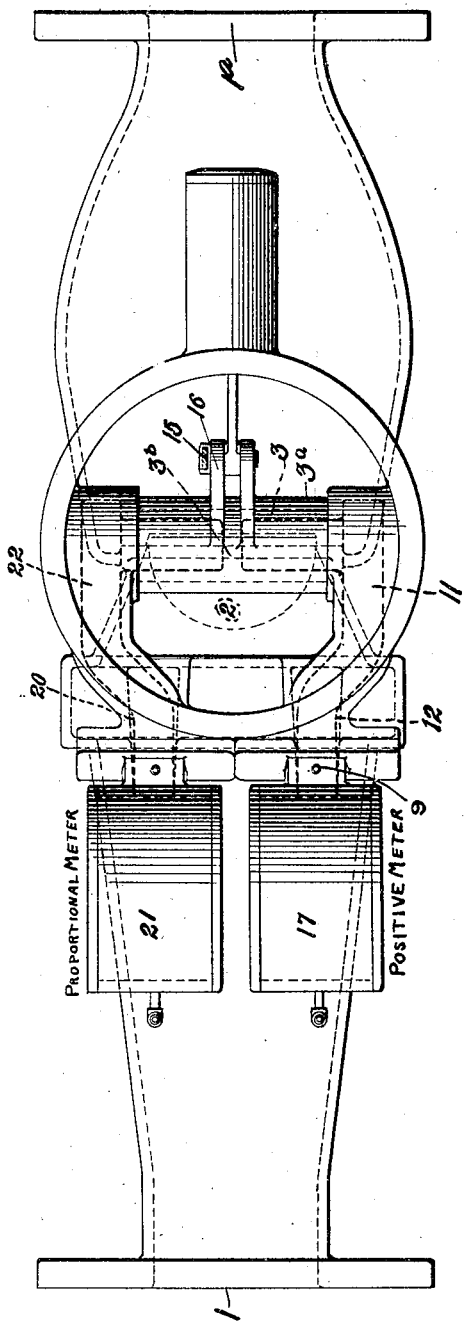

ALBERT B. WOOD, OF NEW ORLEANS, LOUISIANA.

METER.

1,383,687.   Specification of Letters Patent.   Patented July 5, 1921.

Application filed March 22, 1918. Serial No. 223,893.

*To all whom it may concern:*

Be it known that I, ALBERT B. WOOD, a citizen of the United States, residing at New Orleans, in the parish of Orleans and State of Louisiana, have invented certain new and useful Improvements in Meters, of which the following is a specification.

This invention relates to meters for measuring fluids and it has for one of its primary objects the provision of an improved form of meter in which the absorption losses are greatly reduced. My invention also contemplates an improved arrangement of meter having the foregoing characteristic while at the same time the operation of the main controlling valve is more positive and accurate. Certain features of my invention also reside in detailed improvements to be hereinafter more specifically pointed out.

I accomplish the foregoing, together with such other objects as may hereinafter appear, by means of a construction, the preferred embodiment of which I have illustrated in the accompanying drawings, wherein:

Figure 1 is an irregular longitudinal section through a compound meter having my improvements incorporated therein; and Fig. 2 is a plan view of a part of the valve mechanism illustrating the outlet ports for the positive and proportional meters; and Fig. 3 is a section of the meter on the line 3—3 of Fig. 1.

My improvements are capable of use in a number of different forms of meters, but I have found them particularly useful in connection with compound water meters, such for example as that form of meter illustrated in my co-pending application Serial Number 193,266, filed September 26th, 1917, in which a pair of by-passes are provided around the main valve, one of said by-passes having a positive meter and the other by-pass having a tally or detector meter. I have, therefore, shown my improvements as applied to such a meter.

Referring now to the drawings, reference letter A indicates the casing or duct with which the metering devices are associated, such duct being provided with an inlet 1 and an outlet 1ª, between which is located a main controlling valve 2, such valve being hinged on a hollow axle 3 by means of a sleeve 3ª, preferably formed integral with the arm 2ª. The valve 2 is normally pressed toward its seat by any preferred means, such for example as the plunger 4 which is subjected on one side to the pressure within the main and on the other side to atmospheric pressure by means of the port or opening 5. In this connection it will, of course, be understood that the duct A is inserted in a water supply main.

The interior of the axle 3 is divided into two compartments by means of the wall 3ᵇ, one of such compartments having formed through its cylindrical wall a plurality of ports 18 adapted to aline with similar ports 18ª formed in the sleeve 3ª, when the main valve is in closed position. The ports 18 and 18ª control the discharge outlet passage 11 leading from the positive meter casing 17. The inlet passage to the positive meter is indicated by the reference numeral 12; such passages in conjunction with the sleeve 3ª and the axle 3 constituting a by-pass around the main valve. The other portion of the axle 3 is provided with a port 3ᶜ with which a port 3ᵈ in the sleeve 3ª is adapted to come into registration when the main valve opens. The ports 3ᶜ and 3ᵈ control the discharge of water from the proportional meter by-pass. This by-pass is not shown but the arrangement is the same as that just described. It will be apparent from the foregoing that the axle 3 and the sleeve 3ª constitute a Corliss valve controlling the flow of water through the positive and proportional meter by-passes. In order to render the main valve 2 more positive and accurate in operation, and at the same time reduce the absorption in the entire metering apparatus, I provide the following mechanism: A flexible diaphragm 6 is mounted in a hollow cap or closure 6ª in such manner as to divide the interior thereof into two chambers 7 and 8, such chambers being respectively connected to the discharge and inlet passages 11 and 12 of the positive meter by means of the small pipes 9 and 10. The diaphragm is provided with a downwardly depending post 13 adapted to bear against a pin 13ª carried on a link 14, which is connected to the arm 16 of the sleeve 3ª by means of a second link 15.

The operation is as follows: When water is drawn through the main in relatively small quantities or in case of leakage, the main valve 2 is held in closed position and the flow takes place through the inlet 1, passage 12, positive meter 17, discharge passage 11 and through the Corliss valve mechanism to the eduction side of the main valve 2. No flow takes place through the proportional meter by-pass as the ports 3ᶜ and 3ᵈ are out of registry. Due to the friction of the water and mechanism of the positive meter, there will be a drop of pressure between the inlet and discharge passages 12 and 11, the pressure in the discharge passage being less than that in the inlet passage. These pressures are communicated to the chambers 7 and 8 by the pipes 9 and 10 so that the pressure in the chamber 8 will exceed that in the chamber 7 and will thus exert a pressure on the diaphragm 6, rod 13, links 14 and 15 and on the arm 16, and thus on the main valve 2 tending to hold it in closed position and insuring its positive and accurate operation.

When a heavy flow takes place through the main, there is, of course, a large drop in pressure on the eduction side of the main valve 2 and such valve opens closing the port openings 18 and 18ᵃ and bringing the ports 3ᶜ and 3ᵈ into registration. When this takes place no flow occurs through the positive meter by-pass and proportional flows take place through the proportional meter inlet 20, proportional meter 21, and outlet 22 into axle 3. When the main valve opens, it will be apparent that the pressures in the passages 11 and 12 will equalize, since no flow takes place therethrough, and as a result the pressures in the chambers 7 and 8 will be equalized and no force will be exerted upon the main valve. Thus the resistance to flow past the main valve is diminished and very large quantities of water can be drawn with small losses in pressure. I thus accomplish the main object of my invention which is to reduce the absorption losses in the meter. At the same time it will be obvious that the action of the diaphragm is to render the main valve more accurate in operation because the loss in pressure in the proportional meter and its by-pass is compensated for.

I am aware that it is old in this art to employ pressure diaphragms operating to press the main valve toward its seat, but heretofore the diaphragms have been operated by the differential pressure obtaining in the inlet and discharge passages of a proportional meter by-pass. This arrangement is open to objection for the reason that the absorption is increased because of the tendency of the pressure diaphragm in such arrangement to return the main valve to its seat at all drafts sufficient to cause such valve to open and remain open. In so far as I am aware I am the first to utilize the loss of pressure in the small or positive meter to actuate a pressure diaphragm in such manner as to decrease the absorption losses and increase the efficiency or accuracy of the main valve.

It will be obvious that the meter may be used for general commercial service as well as fire service.

I claim:

1. A metering apparatus comprising in combination a casing, a main valve, a positive meter by-pass around said main valve, a differential pressure member tending to press said valve toward its seat, and means for subjecting said member to the pressures from the inlet and discharge sides of said meter by-pass.

2. A metering apparatus comprising in combination a casing, a main valve controlling the flow therethrough, a by-pass around said main valve, a positive meter in said by-pass, a differential pressure diaphragm tending to press said valve toward its seat, and means for subjecting said diaphragm to the pressure from the inlet and discharge sides of said positive meter.

3. A metering apparatus comprising in combination a casing, a main valve controlling the flow therethrough, a by-pass around said valve provided with a positive meter, a second valve mechanism controlled by the movement of said main valve for governing the flow through said by-pass, a differential pressure member adapted to press said main valve toward its seat, and means for subjecting said member to the pressures from the inlet and discharge sides of said positive meter.

4. A metering apparatus comprising in combination a casing, a main valve controlling the flow therethrough, a by-pass around said valve provided with a positive meter, a differential plunger normally tending to press said valve toward its seat, a second differential member normally tending to press said valve toward its seat, and means for subjecting said second member to the pressures from the inlet and discharge sides of said positive meter.

5. A metering apparatus comprising in combination a casing, a main valve for controlling the flow therethrough, a by-pass around said main valve provided with a positive meter, a second valve for controlling the said by-pass operated by the movement of the main valve, a differential plunger normally tending to press said valve toward its seat, a second differential pressure member tending to press said main valve toward its seat, and means for subjecting said second member to the pressures from the inlet and discharge sides of said positive meter.

6. A metering apparatus comprising in combination a casing, a main valve controlling the flow therethrough, a by-pass around said main valve having a positive meter, a pressure operated member tending to press said valve toward its seat, and means for subjecting said member to the differential pressure between the inlet and discharge sides of said positive meter.

7. A proportional metering apparatus comprising in combination a casing, a main valve controlling the flow therethrough, a positive meter by-pass, a proportional meter by-pass, a second valve mechanism for controlling the said by-passes operated by the movement of the main valve in such manner that the positive meter is operated when the main valve is closed and the proportional meter is operated when the main valve is opened, a pressure member adapted to press said main valve toward its seat, and means for subjecting said member to differential pressure from the inlet and discharge sides of the positive meter.

In testimony whereof, I have hereunto signed my name.

ALBERT B. WOOD.